United States Patent
Kimoto et al.

(10) Patent No.: US 11,739,279 B2
(45) Date of Patent: Aug. 29, 2023

(54) LUBRICANT COMPOSITION FOR INITIAL BREAK-IN, SLIDING MEMBER, AND SLIDING MEMBER MANUFACTURING METHOD

(71) Applicant: DAICEL CORPORATION, Osaka (JP)

(72) Inventors: Norihiro Kimoto, Tokyo (JP); Tomohiro Goto, Tokyo (JP); Hiroki Kageyama, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 17/275,080

(22) PCT Filed: Aug. 28, 2019

(86) PCT No.: PCT/JP2019/034676
§ 371 (c)(1),
(2) Date: Mar. 10, 2021

(87) PCT Pub. No.: WO2020/054523
PCT Pub. Date: Mar. 19, 2020

(65) Prior Publication Data
US 2021/0261878 A1 Aug. 26, 2021

(30) Foreign Application Priority Data

Sep. 11, 2018 (JP) .................................. 2018-169388
Nov. 5, 2018 (JP) .................................. 2018-208067
(Continued)

(51) Int. Cl.
*C10M 125/02* (2006.01)
*C10M 169/04* (2006.01)
(Continued)

(52) U.S. Cl.
CPC ........ *C10M 125/02* (2013.01); *C10M 169/04* (2013.01); *F16C 33/043* (2013.01);
(Continued)

(58) Field of Classification Search
CPC .............. C10M 125/02; C10M 169/04; C10M 2201/041; C10M 2203/1006;
(Continued)

(56) References Cited

U.S. PATENT DOCUMENTS 9,023,771 B2    5/2015   Mabuchi et al.
2009/0018037 A1  1/2009   Mabuchi et al.
(Continued)

FOREIGN PATENT DOCUMENTS

EP    0007703 A1   2/1980
JP    55-16080 A   2/1980
(Continued)

OTHER PUBLICATIONS

International Preliminary Report on Patentability and Written Opinion of the International Searching Authority, with an English translation, dated Mar. 9, 2021, for International Application No. PCT/JP2019/034676.
(Continued)

*Primary Examiner* — James C Goloboy
*Assistant Examiner* — Francis C Campanell
(74) *Attorney, Agent, or Firm* — Birch, Stewart, Kolasch & Birch, LLP

(57) ABSTRACT

Provided is an initial break-in lubricant composition capable of easily and economically reducing the coefficient of friction of a sliding portion. The initial break-in lubricant composition includes an organic dispersion medium and nanocarbon particles in a quantity from 0.1 to 2000 ppm by mass. The nanocarbon particles are preferably particles of one or more nanocarbon material(s) selected from the group (Continued)

consisting of: nanodiamonds, fullerenes, graphene oxide, nanographite, carbon nanotubes, carbon nanofilaments, onion-like carbon, diamond-like carbon, amorphous carbon, carbon black, carbon nanohorns, and carbon nanocoils.

7 Claims, 4 Drawing Sheets

(30) Foreign Application Priority Data

Jan. 22, 2019 (JP) .................................. 2019-008241
Jul. 3, 2019 (JP) .................................. 2019-124465

(51) Int. Cl.
*F16C 33/04* (2006.01)
*C10N 30/06* (2006.01)
*C10N 20/06* (2006.01)
*C10N 50/00* (2006.01)
*C10N 40/02* (2006.01)

(52) U.S. Cl.
CPC ... *C10M 2201/041* (2013.01); *C10N 2020/06* (2013.01); *C10N 2030/06* (2013.01); *C10N 2040/02* (2013.01); *C10N 2050/015* (2020.05)

(58) Field of Classification Search
CPC .. C10M 2207/2835; C10M 2205/0285; C10M 2205/223; C10M 2209/1033; C10M 171/06; F16C 33/043; C10N 2020/06; C10N 2030/06; C10N 2040/02; C10N 2050/015

USPC ........................................................ 508/109
See application file for complete search history.

(56) References Cited

U.S. PATENT DOCUMENTS

| | | | |
|---|---|---|---|
| 2009/0048129 A1 | 2/2009 | Mabuchi et al. | |
| 2010/0029518 A1* | 2/2010 | Markovitz | C10M 141/00 508/113 |
| 2012/0308949 A1 | 12/2012 | Hirose et al. | |
| 2013/0209893 A1* | 8/2013 | Archer | C10M 169/04 508/144 |
| 2014/0371118 A1* | 12/2014 | Mosleh | C10M 125/22 508/113 |
| 2016/0060563 A1* | 3/2016 | Kim | C10M 161/00 508/287 |

FOREIGN PATENT DOCUMENTS

| | | |
|---|---|---|
| JP | 5-51588 A | 3/1993 |
| JP | 5-171169 A | 7/1993 |
| JP | 2008-241443 A | 9/2006 |
| JP | 2012-246545 A | 12/2012 |

OTHER PUBLICATIONS

International Search Report, dated Oct. 21, 2019, for International Application No. PCT/JP2019/034676, with an English translation.

* cited by examiner

LUBRICANT COMPOSITION FOR INITIAL BREAK-IN, SLIDING MEMBER, AND SLIDING MEMBER MANUFACTURING METHOD

TECHNICAL FIELD

The present invention relates to a lubricant composition containing nanocarbon particles for initial break-in, a sliding member, and a method of manufacturing the sliding member. The present application claims priority from the Japanese Patent Application No. 2018-169388 filed in Japan on Sep. 11, 2018, the Japanese Patent Application No. 2018-208067 filed in Japan on Nov. 5, 2018, the Japanese Patent Application No. 2019-008241 filed in Japan on Jan. 22, 2019, and the Japanese Patent Application No. 2019-124465 filed in Japan on Jul. 3, 2019, the contents of which are incorporated herein.

BACKGROUND ART

In a machine that has a reciprocal portion that slides (sliding portion) while rubbing with each other, an initial break-in lubricant composition is used to form a break-in surface initially that is suitable against wear on a friction surface of the sliding portion.

At present, surface modification technology is attracting attention as a technique for improving tribological properties in parts used in sliding portions, and various hard films other than metals are being studied as measures to reduce friction and wear of sliding portions. Among them, a hard carbon (diamond-like carbon; DLC) film has high hardness and friction resistance and is also excellent in reducing a coefficient of friction, and thus is expected to be applied to machine parts having a sliding portion. Use of such a hard carbon film on a sliding member is described, for example, in Patent Document 1 below.

Water is mainly used as a lubricant on a hard carbon film, such as a DLC. The use of water as a lubricant on a hard carbon film is expected to achieve very low friction. Such use of water as a lubricant for a sliding member of a hard carbon film, such as a DLC film, is described in, for example, Non-Patent Literature 1 below. Non-Patent Literature 1 indicates that to form a low-friction surface (break-in surface) on a DLC film, wear (pre-sliding) is applied in advance in the air.

CITATION LIST

Patent Document

Patent Document 1: JP 2012-246545 A

Non-Patent Literature

Non-Patent Literature 1: Tribology Conference 2015 Spring, Himeji, Proceedings, "Effect of Running-in on Achieving Low Friction of DLC Films in Water", pp. 288-289

SUMMARY OF INVENTION

Technical Problem

However, surface processing using a DLC film may be difficult to implement depending on the shape of the parts, and another problem is that DLC films are expensive. Also, the effect of friction reduction of a break-in surface formed by a typical initial break-in lubricant composition may be insufficient.

Therefore, an object of the present invention is to provide an initial break-in lubricant composition that can easily and economically reduce the coefficient of friction of a sliding portion.

Another object of the present invention is to provide a sliding member that is easily and economically obtained and has a low coefficient of friction. Yet another object of the present invention is to provide a method of easily and economically manufacturing a sliding member having a low coefficient of friction.

Solution to Problem

As a result of diligent research to achieve the objects described above, the present inventors discovered that, according to an initial break-in lubricant composition having a specific amount of nano-carbon particles dispersed in an organic dispersion medium, the coefficient of friction of a sliding portion can be easily and economically reduced, a sliding member having a specific iron oxide film can be easily and economically obtained, and the coefficient of friction is low. The present invention was completed based on these findings.

That is, the present invention provides an initial break-in lubricant composition including an organic dispersion medium and a nanocarbon particle in a quantity from 0.1 to 2000 ppm by mass.

The above nanocarbon particle is preferably a particle of one or more nanocarbon material(s) selected from the group consisting of: a nanodiamond, a fullerene, graphene oxide, nanographite, a carbon nanotube, a carbon nanofilament, onion-like carbon, diamond-like carbon, amorphous carbon, carbon black, a carbon nanohorn, and a carbon nanocoil.

The above organic dispersion medium is preferably one or more selected from the group consisting of: a polyol ester, a poly-α-olefin, a mineral oil, an alkylbenzene, and a polyalkylene glycol.

The average dispersed particle size D50 of the nanocarbon particle in the above initial break-in lubricant composition is preferably from 4 to 80 nm.

The above initial break-in lubricant composition preferably has a coefficient of friction of 0.14 or less after 200 m sliding when used as an initial break-in lubricant on an SUJ2 sliding surface, the friction coefficient as measured by Friction Test 1 as follows:

Friction Test 1: Using a ball-on-disk sliding friction testing apparatus including a disk having an SUJ2 sliding surface on its surface and a ball having an SUJ2 sliding surface on its surface, a coefficient of friction between the disk and the ball is measured when the ball is sliding 200 m under a load of 10 N at a speed of 50 mm/s with 1 mL of the initial break-in lubricant composition being applied dropwise.

The above initial break-in lubricant composition is preferably has 0.90 to 1.10 as a ratio between a coefficient of friction after 400 m sliding when the initial break-in lubricant composition is used as an initial break-in lubricant on an SUJ2 sliding surface and a coefficient of friction after 750 m sliding when another lubricant is used, the ratio being [the former coefficient of friction]/[the latter coefficient of friction] as measured by Friction Test 2 as follows:

Friction Test 2: Using a ball-on-disk sliding friction testing apparatus including a disk having an SUJ2 sliding surface on its surface and a ball having an SUJ2 sliding surface on its surface, a coefficient of friction between the disk and the ball is measured when the ball is sliding 400 m under a load of 10 N at a speed of 50 mm/s with 1 mL of the initial break-in lubricant composition being applied dropwise, and after the initial break-in lubricant composition is removed, a coefficient of friction between the disk and the ball is measured when the ball is further sliding 750 m (a total of 1150 m) under a load of 10 N at a speed of 50 mm/s with 1 mL of a polyol ester being applied dropwise.

The present invention also provides a sliding member having a base material and an iron oxide film provided on a surface of the base material, and the iron oxide film includes carbon having, in a spectrum obtained through TEM-EELS measurements, a pi star ($\pi^*$) peak observed in a loss energy range from 280 to 290 eV, and sigma star ($\sigma^*$) peaks observed in a loss energy range from 290 to 295 eV, a loss energy range from 295 to 300 eV, and a loss energy range from 302 to 310 eV, respectively.

The above iron oxide film preferably includes a first iron oxide and a second iron oxide, the second iron oxide having a valency of iron different from the first iron oxide.

The above iron oxide film preferably includes an iron oxide having a valency of iron being three.

The above base material is preferably an iron-made base material.

When a ball-on-disk sliding friction testing apparatus including a ball having an SUJ2 sliding surface is used, and the ball slides on a surface of the sliding member under a load of 10 N at a speed of 50 mm/s, the above sliding member preferably has a coefficient of friction of 0.14 or less on its surface with respect to the ball.

The present invention also provides a method of manufacturing a sliding member including an iron-made base material and an iron oxide film that is provided on a surface of the iron-made base material, the method including sliding the iron-made base material and an iron-made body against each other in the presence of a nanodiamond dispersion composition including an organic dispersion medium and nanodiamond particles so as to form the iron oxide film.

Advantageous Effects of Invention

According to the initial break-in lubricant composition of the present invention, the coefficient of friction of the sliding portion can be easily and economically reduced. The sliding member of the present invention has a low coefficient of friction, and can be easily and economically obtained.

DESCRIPTION OF EMBODIMENTS

[Initial Break-in Lubricant Composition]

Figure 1:
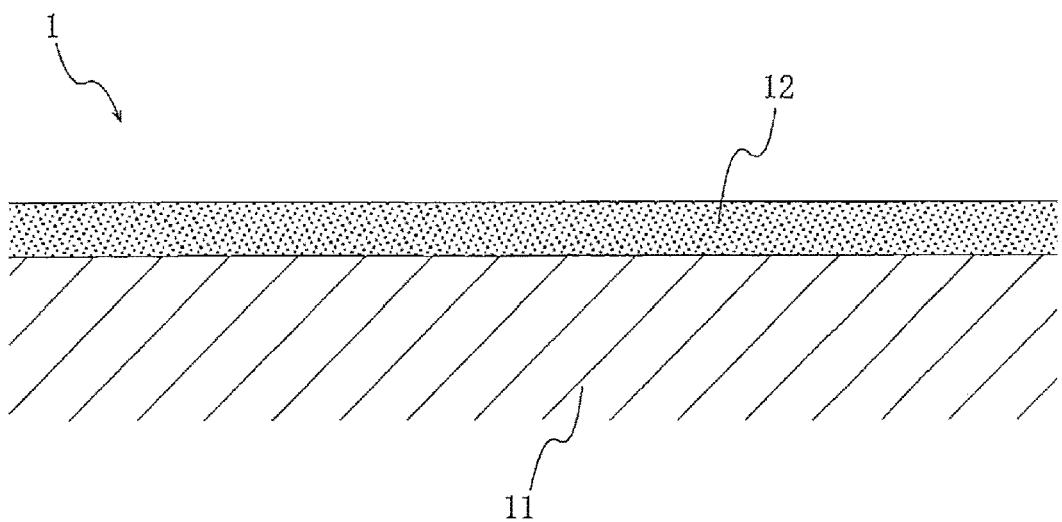
FIG. 1 is a partial cross-sectional schematic view of a sliding member according to an embodiment of the present invention.

The initial break-in lubricant composition according to an embodiment of the present invention includes an organic dispersion medium and nanocarbon particles.

The initial break-in lubricant composition according to an embodiment of the present invention is used to form a low-friction surface (break-in surface) at an initial stage of a machine having a sliding member. Through the initial break-in lubricant composition, for example, unevenness of the surface of the sliding member is smoothed and thus the surface is made flat, or a modified surface is formed. After formation of the break-in surface, the initial break-in lubricant composition is removed through washing, etc., and sliding using a lubricant composition for performing the main lubrication is implemented. Here, the "lubricant composition for performing the main lubrication" refers to a lubricant that is continuously present on the sliding portion and is not normally removed during operation of the sliding member (during use of the machine). Note that the initial break-in lubricant composition according to an embodiment of the present invention can be used as a lubricant composition that is left as-is without being removed after formation of the break-in surface, or is removed and then supplied again to the sliding portion, and used as a lubricant composition for performing the main lubrication.

(Nanocarbon Particles)

The nanoparticles described above are not particularly limited, and particles of a known or commonly used nano-order carbon material (nanocarbon material) can be used. Examples of the nanocarbon material of the nanocarbon particles include nanodiamonds, fullerenes, graphene oxide, nanographite, carbon nanotubes, carbon nanofilaments, onion-like carbon, diamond-like carbon, amorphous carbon, carbon black, carbon nanohorns, and carbon nanocoils. Among these, nanodiamond particles are preferable as the nano carbon particles. A single type of nanocarbon particles may be used, or two or more types may be used. Note that in the present specification, nanodiamonds may be referred to simply as "ND".

The above ND particles are not particularly limited, and known or commonly used nanodiamond particles can be used. The ND particles may be ND particles that have been surface-modified (surface-modified ND), or may be ND particles that have not been surface-modified. Note that ND particles that have not been surface modified have hydroxyl groups (—OH) on the surface. A single type of the ND particles may be used, or two or more types may be used.

Examples of compounds or functional groups that surface modify the ND particles in the surface-modified ND described above include silane compounds, a carboxyl group (—COOH), a phosphonate ion or phosphonic acid residue, a surface-modifying group having a vinyl group at a terminal, an amide group, a cation of a cationic surfactant, a group containing a polyglycerin chain, and a group containing a polyethylene glycol chain.

Of these, the compound or functional group that surface modifies the ND particles in the surface-modified ND described above is preferably a silane compound from the perspective of better excelling in dispersibility in the organic dispersion medium and better excelling in the effect of reducing friction. That is, the surface-modified ND is preferably a surface-modified ND having a silane compound bonded to the surface. By using the surface-modified ND particles described above (in particular, surface-modified ND particles having a silane compound bonded to a surface), the dispersibility of the ND particles is excellent, and the ND particles are easily nano-dispersed in an organic dispersion medium suitable for the initial break-in lubricant composition.

The silane compound preferably has a hydrolyzable group and an aliphatic hydrocarbon group. The silane compound used for surface modification of the ND particles may be only one type, or may be two or more types.

Of the silane compounds, the above silane compound preferably contains at least a compound represented by Formula (1-1) below.

[Chem. 1]

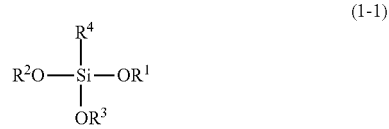

(1-1)

In Formula (1-1) $R^1$, $R^2$, and $R^3$ may be the same or different, and each represent an aliphatic hydrocarbon group having from 1 to 3 carbons. $R^4$ represents an aliphatic hydrocarbon group having one or more carbons.

Examples of the aliphatic hydrocarbon group having from 1 to 3 carbons of $R^1$, $R^2$, and $R^3$ include linear or branched alkyl groups, such as methyl, ethyl, propyl, and isopropyl groups; linear or branched alkenyl groups, such as vinyl and allyl groups; and alkynyl groups, such as an ethynyl group and a propynyl group. Among these, a linear or branched alkyl group is preferred.

The above $R^4$ group is an aliphatic hydrocarbon group, and examples thereof include linear or branched alkyl groups, such as methyl, ethyl, propyl, isopropyl, butyl, isobutyl, s-butyl, t-butyl, pentyl, hexyl, n-octyl, 2-ethylhexyl, nonyl, isononyl, decyl, isodecyl, lauryl, myristyl, isomyristyl, butyloctyl, isocetyl, hexyldecyl, stearyl (octadecyl), isostearyl, octyldecyl, octyldodecyl, and isobehenyl groups; linear or branched alkenyl groups, such as vinyl, allyl, 1-butenyl, 7-octenyl, 8-nonenyl, 9-decenyl, 11-dodecenyl, and oleyl groups; and linear or branched alkynyl groups, such as ethynyl, propynyl, decynyl, pentadecynyl, and octadecynyl groups.

Among these, from the viewpoint of obtaining higher lipophilicity and greater steric hindrance and thereby excelling in an aggregation suppressing effect and being able to impart higher dispersibility, the $R^4$ is preferably an aliphatic hydrocarbon group having 4 or more carbons, and is particularly preferably an aliphatic hydrocarbon group having 6 or more carbons. Note that the upper limit of the number of carbons of the aliphatic hydrocarbon group is, for example, 25, and is preferably 20, and more preferably 12. Furthermore, the aliphatic hydrocarbon group is preferably a linear or branched alkyl group or alkenyl group, and is particularly preferably a linear or branched alkyl group.

Therefore, examples of the ND particles surface-modified by a silane compound (silane compound surface-modified ND particles) include ND particles having a structure that has been surface modified by a group represented by Formula (1) below.

[Chem. 2]

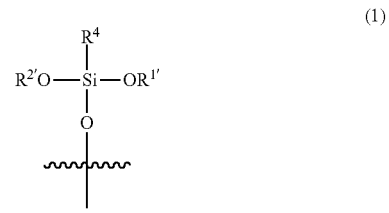

(1)

In Formula (1), $R^4$ represents an aliphatic hydrocarbon group having one or more carbons. $R^{1'}$ and $R^{2'}$ may be the same or different, and each represents a hydrogen atom, an aliphatic hydrocarbon group having from 1 to 3 carbons, or a group represented by Formula (a) below. The bond indicated by a wavy line in the formula bonds to the surface of the ND particles.

[Chem. 3]

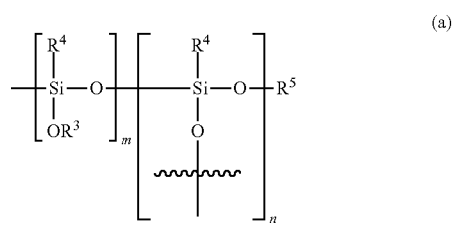

(a)

In Formula (a) above, $R^4$ represents an aliphatic hydrocarbon group. $R^3$ and $R^5$ may be the same or different, and each represents a hydrogen atom or an aliphatic hydrocarbon group having from 1 to 3 carbons, Also, m and n may be the same or different, and each represents an integer of 0 or greater. Note that the bond extending to the left from the silicon atom bonds to an oxygen atom. Also, the bond indicated by a wavy line bonds to the surface of the ND particle.

Examples of the aliphatic hydrocarbon group having from 1 to 3 carbons of $R^{1'}$, $R^{2'}$, $R^3$, and $R^5$ in the above Formula (1) include linear or branched alkyl groups, such as methyl, ethyl, propyl, and isopropyl groups; linear or branched alkenyl groups, such as vinyl and allyl groups; and alkynyl groups, such as an ethynyl group and a propynyl group. Among these, a linear or branched alkyl group is preferred.

$R^4$ in Formula (1) above corresponds to the $R^4$ in Formula (1-1). In other words, $R^4$ in Formula (1) is preferably an aliphatic hydrocarbon group having 4 or more carbons, and is particularly preferably an aliphatic hydrocarbon group having 6 or more carbons. Note that the upper limit of the number of carbons of the aliphatic hydrocarbon group is, for example, 25, and is preferably 20, and more preferably 12. Furthermore, the aliphatic hydrocarbon group is preferably a linear or branched alkyl group or alkenyl group, and is particularly preferably a linear or branched alkyl group.

When $R^4$ is an aliphatic hydrocarbon group having 4 or more carbons, miscibility with regards to the organic dispersion medium is exhibited, and a larger steric hindrance can be obtained, and thus the aggregation suppression effect is superior. Also, the groups containing an oxygen atom (the $OR^{1'}$ group and the $OR^{2'}$ group in Formula (1)) exhibit miscibility with respect to the organic dispersion medium, and therefore the miscibility with regards to the organic dispersion medium is excellent, and even better dispersibility in the organic dispersion medium can be exhibited.

Further, m and n each indicate the number of constituent units shown in parentheses, and may be the same or different, and each indicates an integer of 0 or greater. In a case where m and n are each 2 or greater, the bonding of two or more constituent units may be any of random, alternating, or block.

Furthermore, the above silane compound surface-modified ND particles may have, besides the groups represented by Formula (1) above, for example, a group represented by Formula (1') below and/or other functional groups such as an amino group, a hydroxy group, and a carboxyl group. The above other functional groups may be only one type or may be two or more types.

[Chem. 4]

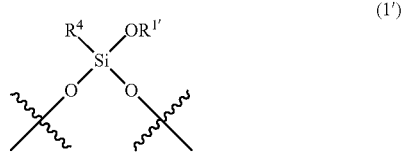

(1')

In Formula (1') above, $R^{1'}$ and $R^4$ are the same as those described above. The bond indicated by a wavy line in the formula bonds to the surface of the nanodiamond particles.

In a case where a silane compound (in particular, a compound represented by Formula (1-1) above) is used as the compound implementing a surface treatment, the hydrolyzable alkoxysilyl groups such as the $OR^1$ group, the $OR^2$ group, and the $OR^3$ group of the compound in Formula (1-1) are easily hydrolyzed to form silanol groups, and therefore, for example, one of the silanol groups undergoes dehydration condensation with a hydroxyl group present on the surface of the ND particle and forms a covalent bond, and the other silanol groups of the silane compound can condense and form a siloxane bond (Si—O—Si) with the remaining two silanol groups, and thus the compound can impart, to the ND particles, miscibility with respect to the organic dispersion medium, and more excellent dispersibility in the organic dispersion medium can be exhibited.

(Organic Dispersion Medium)

Known or commonly used organic solvents can be used as the organic dispersion medium. Among these, from the perspective of being able to use the initial break-in lubricant composition in an initial break-in application, and then continue to use the initial break-in lubricant composition thereof as is as a lubricant composition, or from the perspective of being less likely to cause problems due to contamination of the organic dispersion medium at the sliding portion even when a new lubricant composition is used after the initial break-in lubricant composition has been used and washed away, the organic dispersion medium is preferably an organic dispersion medium of a lubricant base.

A single type of the organic dispersion medium may be used, or two or more types of organic dispersion mediums may be used.

Examples of the organic dispersion medium of a lubricant base include polyphenyl ethers, alkylbenzenes, alkylnaphthalenes, ester oils, glycol-based synthetic oils, polyolefin-based synthetic oils, and mineral oils. More specifically, examples include poly-α-olefins, ethylene-α-olefin copolymers, polybutene, alkylbenzenes, alkylnaphthalenes, polyalkylene glycols, polyphenyl ethers, alkyl-substituted diphenyl ethers, polyol esters, dibasic acid esters, carbonates, phosphates, silicone oils, fluorinated oils, gas-to-liquids (GTL), and mineral oils. A single type of the organic dispersion medium of a lubricant base may be used, or two or more types thereof may be used.

Among these, polyol esters, poly-α-olefins, mineral oils, alkylbenzenes, and polyalkylene glycols are preferable as the organic dispersion medium from the perspective of better excelling in the effect of reducing the coefficient of friction of the sliding portion.

The rate of content of the nanocarbon particles in the initial break-in lubricant composition according to an embodiment of the present invention is from 0.1 to 2000 ppm by mass, preferably from 0.2 to 1000 ppm by mass, more preferably from 0.5 to 500 ppm by mass, and even more preferably from 1 to 100 ppm by mass. When the above rate of content is set to 0.1 ppm by mass or greater, the initial break-in lubricant composition excels in the effect of reducing the coefficient of friction of the sliding portion. In addition, when the rate of content is set to not greater than 2000 ppm by mass, the dispersibility of the nanocarbon particles in the initial break-in lubricant composition is excellent, the stability while forming the break-in surface is excellent, and the break-in surface can be stably formed. In particular, the rate of content of the ND particles is preferably within the range described above.

Note that the rate of content of the nanocarbon particles (in particular, ND particles) in the initial break-in lubricant composition according to an embodiment of the present invention may be from 0.1 to 2000 ppm by mass during use, that is, when forming the break-in surface on the sliding member, and may be outside of the range described above at times other than during use (for example, during distribution). The rate of content of the nanocarbon particles (in particular, ND particles) in the initial break-in lubricant composition according to an embodiment of the present invention may be, for example, from 0.01 to 5.0 mass %, preferably from 0.1 to 4.0 mass %, more preferably from 0.25 to 3.0 mass %, and even more preferably from 0.5 to 2.0 mass %. The initial break-in lubricant composition according to an embodiment of the present invention excels in dispersibility of the nanocarbon particles, and therefore dispersibility in the organic dispersion medium is excellent even at such a rate of content.

The rate of content of the nanocarbon particles can be calculated from the absorbance at 350 nm. Note that when the rate of content of the surface-modified ND particles is a low concentration (for example, less than or equal to 2000 ppm by mass), a compound in which the ND particles are surface modified by high-frequency inductively-coupled plasma emission spectroscopy (ICP emission spectroscopy) can be detected, and the rate of content can be determined on the basis of the detected amount.

The rate of content of solvent in the initial break-in lubricant composition according to an embodiment of the present invention is, for example, from 90 to 99.9999 mass %. The rate of content of the organic dispersion medium with respect to the total amount of the solvent is, for example, not less than 60 mass %, preferably not less than 70 mass %, even more preferably not less than 80 mass %, and particularly preferably not less than 90 mass %.

The initial break-in lubricant composition according to an embodiment of the present invention has nanocarbon particles dispersed in the organic dispersion medium. The average dispersed particle size (D50, median diameter) of the nanocarbon particles in the initial break-in lubricant composition according to an embodiment of the present invention is preferably from 2 to 100 nm, more preferably from 4 to 80 nm, even more preferably from 6 to 60 nm, yet even more preferably from 10 to 40 nm, and particularly preferably from 11 to 30 nm. The average dispersed particle size can be measured using a dynamic light scattering method, When the average dispersed particle size of the nanocarbon particles is within the range described above, the dispersibility of the nanocarbon particles in the initial break-in lubricant composition is excellent, and the coefficient of friction (in particular, the coefficient of friction at a boundary lubrication region) can be sufficiently reduced.

When the rate of content of the nanocarbon particles in the initial break-in lubricant composition according to an embodiment of the present invention is from 0.1 to 2000 ppm by mass, the average dispersed particle size (D50) of the nanocarbon particles in the initial break-in lubricant composition according to an embodiment of the present invention is, in particular, preferably from 5 to 100 nm, more preferably from 8 to 80 nm, even more preferably from 10 to 60 nm, yet even more preferably from 15 to 40 nm, and particularly preferably from 18 to 35 nm.

When the rate of content of the nanocarbon particles in the initial break-in lubricant composition according to an embodiment of the present invention is from 0.01 to 5.0 mass %, the average dispersed particle size (D50) of the nanocarbon particles in the initial break-in lubricant composition according to an embodiment of the present invention is, in particular, preferably from 2 to 50 nm, more preferably from 4 to 30 nm, even more preferably from 6 to 25 nm, and particularly preferably from 10 to 20 nm.

The initial break-in lubricant composition according to an embodiment of the present invention has a haze value of preferably 5 or less, more preferably 3 or less, and even more preferably 1 or less. Since the initial break-in lubricant composition according to an embodiment of the present invention exhibits excellent dispersibility of the nanocarbon particles, an initial break-in lubricant composition having the above haze value can be obtained. The haze value can be measured according to JIS K 7136.

When the initial break-in lubricant composition according to an embodiment of the present invention is used as an initial break-in lubricant of an SUJ2 sliding surface, a coefficient of friction of the SUJ2 sliding surface after sliding 200 m is preferably 0.14 or less as measured in a below-described friction test 1. The coefficient of friction after sliding 200 m is preferably 0.13 or less and more preferably 0.12 or less.

Friction Test 1: Using a ball-on-disk sliding friction testing apparatus including a disk having an SUJ2 sliding surface on its surface and a ball having an SUJ2 sliding surface on its surface, a coefficient of friction between the disk and the ball is measured when the ball is sliding 200 m under a load of 10 N at a speed of 50 mm/s with 1 mL of the initial break-in lubricant composition being applied dropwise.

The initial break-in lubricant composition according to an embodiment of the present invention is preferably such that a ratio between a coefficient of friction after 400 m sliding when the initial break-in lubricant composition is used as an initial break-in lubricant on an SUJ2 sliding surface and a coefficient of friction after 750 m sliding when another lubricant is used, the ratio being [the former coefficient of friction]/[the latter coefficient of friction] as measured by Friction Test 2 is from 0.90 to 1.50. The above ratio is preferably from 0.95 to 1.30, and more preferably from 1.05 to 1.25.

Friction Test 2: Using a ball-on-disk sliding friction testing apparatus including a disk having an SUJ2 sliding surface on its surface and a ball having an SUJ2 sliding surface on its surface, a coefficient of friction between the disk and the ball is measured when the ball is sliding 400 m under a load of 10 N at a speed of 50 mm/s with 1 mL of the initial break-in lubricant composition being applied dropwise, and after the initial break-in lubricant composition is removed, a coefficient of friction between the disk and the ball is measured when the ball is further sliding 750 m (a total of 1150 m) under a load of 10 N at a speed of 50 mm/s with 1 mL of a polyol ester being applied dropwise.

The initial break-in lubricant composition according to an embodiment of the present invention may include only the nanocarbon particles and the organic dispersion medium, or may contain other components. Examples of other components include surfactants, thickeners, coupling agents, dispersants, rust inhibitors, corrosion inhibitors, freezing point depressants, anti-foaming agents, anti-wear additives, antiseptics, and colorants. With respect to the total amount of the initial break-in lubricant composition according to an embodiment of the present invention, the rate of content of the other components is, for example, not greater than 30 mass %, preferably not greater than 20 mass %, more preferably not greater than 10 mass %, even more preferably not greater than 5 mass %, and particularly preferably not greater than 1 mass %. Therefore, with respect to the total amount of the initial break-in lubricant composition according to an embodiment of the present invention, the total rate of content of the nanocarbon particles and the organic dispersion medium is, for example, not less than 70 mass %, preferably not less than 80 mass %, more preferably not less than 90 mass %, even more preferably not less than 95 mass %, and particularly preferably not less than 99 mass %.

When initial break-in of the sliding portion (forming of the break-in surface) is implemented using the initial break-in lubricant composition according to an embodiment of the present invention, the coefficient of friction of the sliding portion can be easily and economically reduced. Furthermore, seizing of the sliding member can be suppressed and the amount of wear of the sliding member can be reduced by using the initial break-in lubricant composition according to an embodiment of the present invention.

(Method for Manufacturing the Initial Break-in Lubricant Composition)

The initial break-in lubricant composition according to an embodiment of the present invention can be manufactured, for example, by mixing and dispersing the nanocarbon particles and, as necessary, other components in the organic dispersion medium described above.

A method for manufacturing an initial break-in lubricant composition using ND particles as nanocarbon particles will be described below. For example, an initial break-in lubricant composition that uses surface-modified ND particles can be manufactured by causing a compound that implements a surface treatment to react with the ND particles in an organic dispersion medium (modification). In this case, the solvent used in the modification can be used as is as the organic dispersion medium in the initial break-in lubricant composition. In addition, the solvent used in the modification may be used as is as the organic dispersion medium in the initial break-in lubricant composition, or the solvent may be replaced after the modification.

In the modification described above, in a case where ND particle aggregates, which occur when ND particles aggregate to form secondary particles, are included in the ND particles, the reaction between the ND particles and the compound that implements a surface treatment is preferably performed while crushing or dispersing the ND particles. Through this, the ND particle aggregates can be crushed into primary particles, the surface of the ND primary particles can be modified, and the dispersibility of the ND particles in the initial break-in lubricant composition can be improved.

A mass ratio (ND particles:compound) of the ND particles to the surface treatment-implementing compound (in particular, a silane compound) that are supplied to the reaction in the modification process, is, for example, from 2:1 to 1:20. Furthermore, the concentration of the ND particles in the organic dispersion medium when implementing the surface treatment is, for example, from 0.5 to 10 mass %, and the concentration of the compound in the organic dispersion medium is, for example, from 5 to 40 mass %.

The reaction time for the surface treatment is, for example, from 4 to 20 hours. Furthermore, the reaction is preferably performed while heat that is generated is removed through cooling using ice water or the like.

Examples of the method for crushing or dispersing the ND particles include methods that process the ND particles using a high shearing mixer, a high shear mixer, a homomixer, a ball mill, a bead mill, a high pressure homogenizer, an ultrasonic homogenizer, a colloid mill, or a jet mill. Among these, implementing an ultrasonic treatment in the presence of a crushing medium (such as zirconia beads for example) is preferred.

The diameter of the crushing medium (such as zirconia beads for example) is, for example, from 15 to 500 μm, preferably from 15 to 300 μm, and particularly preferably from 15 to 100 μm.

In addition, when an organic dispersion medium that is advantageous for the reaction for surface treatment is used in the modification, once a dispersion of the surface-modified ND particles is obtained, the organic dispersion medium in the dispersion is distilled away using an evaporator or the like, after which the organic dispersion medium suitable for the initial break-in lubricant composition is newly mixed and stirred. In other words, the initial break-in lubricant composition can also be manufactured through a replacement of the organic dispersion medium. By adopting a method in which a dispersion having surface-modified ND particles nano-dispersed therein is obtained in the modification process, after which the organic dispersion medium is replaced with an organic dispersion medium suited for the initial break-in lubricant composition without forming the ND particles into a dry powder, and by selecting, as appropriate, both the organic dispersion medium used in the modification and the organic dispersion medium suited for the initial break-in lubricant composition with consideration of the wettability and solubility of both organic dispersion mediums, the ND particles are easily nano-dispersed in the organic dispersion medium suited for the initial break-in lubricant composition.

As described above, an initial break-in lubricant composition in which ND particles are dispersed in an organic solvent is obtained.

Note that the ND particles can be manufactured by, for example, a detonation method. Examples of the detonation method include an air-cooling detonation method and a water-cooling detonation method. Among these, the air-cooling detonation method is preferred from the viewpoint of being able to obtain ND particles having smaller primary particles compared to the case of the water-cooling detonation method.

Furthermore, the detonation may be performed in an air atmosphere, or may be performed in an inert gas atmosphere, such as a nitrogen atmosphere, an argon atmosphere, or a carbon dioxide atmosphere.

An example of the method for producing the ND particles is described below; however, the ND particles used in an embodiment of the present invention are not limited to those obtained by the following production method.

(Formation)

First, a molded explosive attached with an electric detonator is placed inside a pressure-resistant vessel for detonation, and the vessel is sealed in a state where gas of atmospheric composition at normal pressure and the explosive to be used coexist inside the vessel. The vessel is, for example, made of iron, and the volume of the vessel is, for example, from 0.5 to 40 m$^3$. A mixture of trinitrotoluene (TNT) and cyclotrimethylenetrinitramine, i.e., hexogen (RDX), can be used as the explosive. The mass ratio (TNT/RDX) of TNT to RDX is, for example, in a range from 40/60 to 60/40.

In the formation, the electric detonator is then triggered to detonate the explosive in the vessel. "Detonation" refers to an explosion, among those associated with a chemical reaction, wherein a flame surface where the reaction occurs travels at a high speed exceeding the speed of sound. During the detonation, the explosive that is used undergoes partially incomplete combustion and releases carbon, and the carbon thereof is used as a raw material to produce ND particles through the action of the pressure and energy of the shock waves that are produced in the explosion. Due to Coulomb interaction between crystal planes as well as van der Waals forces between adjacent primary particles or crystallites, the produced ND particles aggregate very firmly to form aggregates.

In the formation, next, the vessel and its interior are left to stand for approximately 24 hours at room temperature, and are thereby allowed to be cooled. After the cooling, the crude product of ND particles (including the soot and aggregates of the ND particles formed as described above) adhered to the inner wall of the vessel is scraped off with a spatula, and the crude product of ND particles is thereby collected. Crude product of ND particles can be obtained by the method described above. Furthermore, by implementing the above-described process of forming nanodiamonds several times as necessary, a desired amount of the crude product of ND particles can be obtained.

(Acid Treatment)

In an acid treatment, a strong acid is allowed to act on the crude product of ND particles, which is a raw material, in a solvent of water for example to remove a metal oxide. The ND particle crude product obtained by the detonation method is prone to include a metal oxide, and the metal oxide is an oxide of Fe, Co, Ni, or the like resulting from the vessel or the like used in the detonation method. The metal oxide can be dissolved and removed from the ND particle crude product by allowing a strong acid to act thereon in an aqueous solvent, for example. The strong acid used in the acid treatment is preferably a mineral acid, and examples thereof include hydrochloric acid, hydrofluoric acid, sulfuric acid, nitric acid, and aqua regia. A single kind of the strong acid may be used, or two or more kinds of the strong acids may be used. The concentration of the strong acid used in the acid treatment is, for example, from 1 to 50 mass %. The acid treatment temperature is, for example, from 70 to 150° C. The duration of the acid treatment is, for example, from 0.1 to 24 hours. In addition, the acid treatment can be performed under reduced pressure, under normal pressure, or under increased pressure. After such an acid treatment, the solid content (containing the nanodiamond aggregates) is washed with water through decantation for example. The solid is preferably repeatedly washed with water by decantation until the pH of the precipitation solution reaches, for example, 2 to 3. In a case where the content of the metal oxide in the ND particle crude product obtained by the detonation method is small, the acid treatment as described above may be omitted.

(Oxidation Treatment)

The oxidation treatment is a process to remove graphite from the ND particle crude product using an oxidizing agent. The ND particle crude product obtained by the detonation method includes graphite, and this graphite is derived from carbon that did not form ND particle crystals, the carbon thereof being from among the carbon released by partially incomplete combustion of the explosive that is used. The graphite can be removed from the ND particle crude product by allowing an oxidizing agent to act thereon in an aqueous solvent. Furthermore, by allowing the oxidizing agent to act thereon, an oxygen-containing group, such as a carboxyl group or a hydroxy group, can be introduced onto the ND particle surface.

Examples of the oxidizing agent used in the oxidation treatment include chromic acid, chromic anhydride, dichromic acid, permanganic acid, perchloric acid, nitric acid, and mixtures thereof, a mixed acid of at least one acid selected therefrom and another acid (for example, sulfuric acid), and salts thereof. Among these, a mixed acid (in particular, a mixed acid of sulfuric acid and nitric acid) is preferably used since such a mixed acid is environmentally friendly and exhibits excellent performance in oxidizing and removing graphite.

The mixing ratio of sulfuric acid to nitric acid (the former/the latter, mass ratio) in the above-described mixed acid is preferably, for example, from 60/40 to 95/5 because when the mixing ratio is in that range, the graphite can be efficiently oxidized and removed at, for example, a temperature of 130° C. or higher (particularly preferably 150° C. or higher, and the upper limit being 200° C., for example), even under a pressure near normal pressure (for example, from 0.5 to 2 atm). The lower limit of the mixing ratio is preferably 65/35, and more preferably 70/30. The upper limit of the mixing ratio is preferably 90/10, more preferably 85/15, and still more preferably 80/20. When the mixing ratio is not less than 60/40, the content of sulfuric acid having a high boiling point is high, and therefore the reaction temperature becomes, for example, 120° C. or higher under a pressure near that of normal pressure, and therefore, the efficiency in graphite removal tends to be improved. When the mixing ratio is less than or equal to 95/5, nitric acid that greatly contributes to oxidation of graphite is contained in a larger amount, and thus efficiency in graphite removal tends to be improved.

The usage amount of the oxidizing agent (in particular, the mixed acid) is, for example, from 10 to 50 parts by mass, preferably from 15 to 40 parts by mass, and particularly preferably from 20 to 40 parts by mass, per 1 part by mass of the ND particle crude product. In addition, the usage amount of sulfuric acid in the mixed acid is, for example, from 5 to 48 parts by mass, preferably from 10 to 35 parts by mass, and more preferably from 15 to 30 parts by mass, per 1 part by mass of the ND particle crude product. In addition, the usage amount of nitric acid in the mixed acid is, for example, from 2 to 20 parts by mass, preferably from 4 to 10 parts by mass, and more preferably from 5 to 8 parts by mass, per 1 part by mass of the ND particle crude product.

Furthermore, when the mixed acid is used as the oxidizing agent, a catalyst may be used together with the mixed acid. When the catalyst is used, the removal efficiency of graphite can be further improved. Examples of the catalyst include copper (II) carbonate. The usage amount of the catalyst is, for example, approximately from 0.01 to 10 parts by mass per 100 parts by mass of the ND particle crude product.

The oxidation treatment temperature is, for example, from 100 to 200° C. The duration of the oxidation treatment is, for example, from 1 to 24 hours. The oxidation treatment can be performed under reduced pressure, under normal pressure, or under increased pressure.

(Alkali and Hydrogen Peroxide Treatment)

When the metal oxide is not completely removed and remains on the ND particles even after the acid treatment described above, aggregates (secondary particles) are formed by very strong interaction between primary particles, resulting in aggregation. In such a case, an alkali and hydrogen peroxide may be allowed to act on the ND particles in an aqueous solvent. Consequently, the metal oxide remaining on the ND particles can be removed, and separation of the primary particles from the aggregates can be promoted. Examples of the alkali used in this treatment include sodium hydroxide, ammonia, and potassium hydroxide. In alkali and hydrogen peroxide treatment, the concentration of the alkali is, for example, from 0.1 to 10 mass %, the concentration of hydrogen peroxide is, for example, from 1 to 15 mass %, the treatment temperature is, for example, from 40 to 100° C. and the treatment time is, for example, from 0.5 to 5 hours. Furthermore, the alkali and hydrogen peroxide treatment can be performed under reduced pressure, at normal pressure, or under pressurization.

After the above oxidation treatment or alkali and hydrogen peroxide treatment, it is preferable to remove the supernatant by decantation, for example. In addition, in decantation, the solid content is preferably washed with water. The supernatant liquid from the initial washing with water is colored, and thus, the solid content is preferably repeatedly washed with water until the supernatant liquid becomes visually transparent.

(Crushing Treatment)

The ND particles may be subjected to a crushing treatment as necessary. The crushing treatment can be performed using, for example, a high shearing mixer, a high shear mixer, a homomixer, a ball mill, a bead mill, a high pressure homogenizer, an ultrasonic homogenizer, or a colloid mill. Note that the crushing treatment may be performed by a wet process (for example, a crushing treatment in a state of being suspended in water or the like), or may be performed by a dry process. When the crushing treatment is performed by a dry process, drying is preferably performed before the crushing treatment.

(Drying)

Drying is preferably performed after the alkali and hydrogen peroxide treatment. For example, a spray drying apparatus or an evaporator, etc., is used to evaporate the liquid content from the ND particle-containing solution obtained through the alkali and hydrogen peroxide treatment, after which the resulting residual solid content is dried by being heated and dried in a drying oven. The temperature for heating and drying is, for example, from 40 to 150° C. Through such drying, ND particles are obtained.

Furthermore, as necessary, the ND particles may be subjected to an oxidation treatment (for example, oxygen oxidation) or a reduction treatment (for example, a hydrogenation treatment) in a gas phase as necessary. By performing an oxidation treatment in the gas phase, ND particles having a large amount of C=O groups on the surface are obtained. In addition, by carrying out a reduction treatment in the gas phase, ND particles having a large amount of C—H groups on the surface are produced.

[Sliding Member]

The sliding member according to an embodiment of the present invention has a base material and an iron oxide film provided on the surface of the base material, and the iron oxide film includes carbon having, in a spectrum obtained through TEM-EELS measurements, a pi star ($\pi^*$) peak observed in a loss energy range from 280 to 290 eV, and sigma star ($\sigma^*$) peaks observed in a loss energy range from 290 to 295 eV, a loss energy range from 295 to 300 eV, and a loss energy range from 302 to 310 eV, respectively. The sliding member according to an embodiment of the present invention can be manufactured, for example, by sliding an iron-made base material and an iron-made body against each other in the presence of an initial break-in lubricant composition according to an embodiment of the present invention, the lubricant composition including an organic dispersion medium and nanodiamond particles.

As described above, the sliding member according to an embodiment of the present invention has at least a base material and an iron oxide film provided on a surface of the base material. The sliding member according to an embodiment of the present invention may have a layer besides the base material and iron oxide film. In the sliding member according to an embodiment of the present invention, the base material and the iron oxide film have at least some contact regions.

FIG. 1 is a cross-sectional schematic view illustrating one embodiment of the sliding member of the present invention. As illustrated in FIG. 1, a sliding member 1 is provided with a base material 11 and an iron oxide film 12 provided on a surface of the base material 11. The sliding member 1 is provided with the iron oxide film 12 on the entire surface of the base material 11. The sliding member 1 may have a region (iron oxide film unformed region) not having the iron oxide film 12 on the base material 11. The thickness of the iron oxide film 12 is uniform in the region where the iron oxide film 12 is present.

Figure 2:
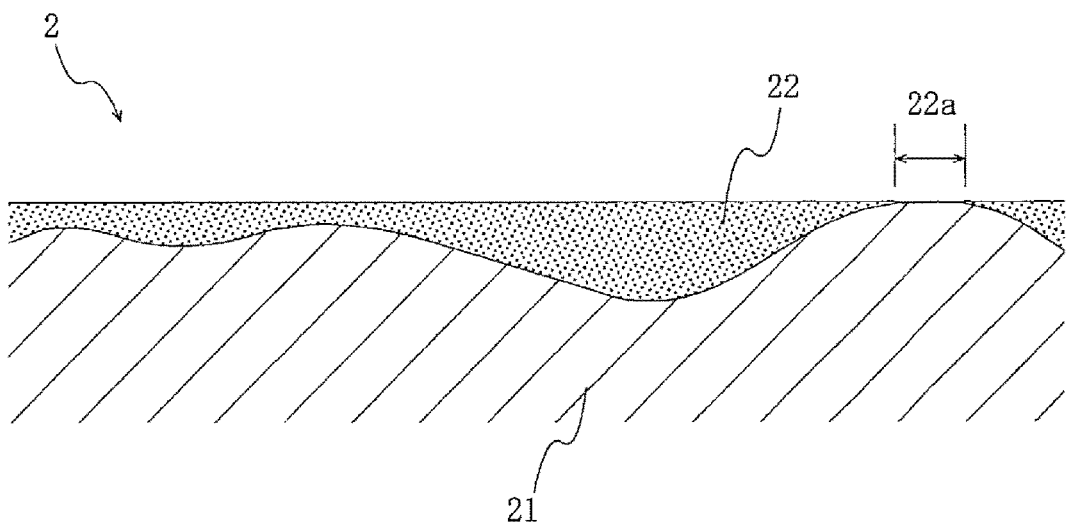
FIG. 2 is a partial cross-sectional schematic view of a sliding member according to another embodiment of the present invention.

FIG. 2 is a cross-sectional schematic view illustrating another embodiment of the sliding member according to the present invention. As illustrated in FIG. 2, a sliding member 2 includes a base material 21 and an iron oxide film 22 provided on a surface of at least a portion of the base material 21. The sliding member 2 has a region (iron oxide film unformed region) 22a that does not have the iron oxide film 22 on the base material 21. More specifically, when viewed from the iron oxide film 22 side (the top side of the drawing), the sliding member 2 has an iron oxide film unformed region 22a within a region in which the iron oxide film 22 is formed. Note that the sliding member 2 may have a form that does not include the iron oxide film unformed region 22.

The thickness of the iron oxide film 22 is not uniform in the region where the iron oxide film 22 is present. In addition, the thickness of the iron oxide film 22 having a non-uniform thickness continuously increases and decreases (gradually increases and gradually decreases), but may increase or decrease stepwise or discontinuously. Furthermore, the surface of the iron oxide film 22 (surface on the side opposite the base material 21) may be planar or curved, but is preferably smooth.

The base material is not particularly limited as long as the base material has the purpose of forming the iron oxide film and reducing the coefficient of friction of the sliding member surface. Examples of the material constituting the base material include known or commonly used materials that are used for a sliding member, including, for example, metals such as iron, copper, aluminum, and titanium, and various resins. The base material is particularly preferably an iron-made base material. When the base material is made of iron, the iron oxide film can be more easily and economically formed. The base material may be constituted of one type of material or may be constituted of two types of materials.

As the iron material constituting the iron-made base material, a known or commonly used iron material can be used, including for example, cast iron such as FC, FCD and FCM, and steel such as SS, SM, SPCC, S10C, S20C, S30C, S45C, S55C, SCr, SNC, SK, SKD, SKH, SUP, SUJ, SUM, SUS, and SUH. One type of such iron material may be used, or two or more types thereof may be used. Of these, SUJ (such as SUJ2) is preferable.

The iron oxide film includes iron oxide as a main component. Examples of the iron oxide include iron oxides having a valency of iron of two, and iron oxides having a valency of iron of three. Examples of the above iron oxides include iron (II) oxide, iron (III) oxide, iron (II, III) oxide, and iron oxyhydroxide. The iron oxide film preferably contains, as the iron oxide, an iron oxide having a valency of iron of three. The iron oxide film may contain only one type of iron oxide, or may include two or more types of iron oxide.

The iron oxide preferable contains, as the iron oxide, a first iron oxide and a second iron oxide having a valency of iron that differs from that of the first iron oxide. Examples of combinations of the first iron oxide and the second iron oxide include iron (II) oxide and iron (III) oxide, iron (II) oxide and iron (II, III) oxide, iron (II) oxide and iron oxyhydroxide, iron (III) oxide and iron (II, III) oxide, and iron (II, III) oxide and iron oxyhydroxide. When the iron oxide film includes the first iron oxide and the second iron oxide, the iron oxide film may further contain a third iron oxide having a valency of iron that differs from that of the first iron oxide and the second iron oxide.

In the iron oxide film, a difference between a maximum loss energy at the peak top of the iron oxide in the iron oxide film and the loss energy at the peak top of the iron oxide at the base material-iron oxide film interface, that is, the [(maximum loss energy in the iron oxide film)−(loss energy at interface between the base material and iron oxide film)], is preferably not less than 1.3 eV, and more preferably not less than 1.4 eV. A larger difference indicates a larger valency of iron of the iron oxide in the iron oxide film. The difference in loss energy can be derived by TEM-EELS measurements.

The iron oxide film contains carbon having, in a spectrum obtained through TEM-EELS measurements, a pi star ($\pi^*$) peak observed in a loss energy range from 280 to 290 eV, and sigma star ($\sigma^*$) peaks observed in loss energy ranges from 290 to 295 eV, from 295 to 300 eV, and from 302 to 310 eV, respectively. Carbon having the above $\pi^*$ peak and $\sigma^*$ peaks is a characteristic carbon in the sliding member according to an embodiment of the present invention, and is assumed to include carbon derived from diamond and carbon derived from a carbon other than diamond (such as graphite and amorphous carbon). In the present specification, the TEM-EELS measurement is a measurement method that combines electron energy loss spectroscopy (EELS) with transmission electron microscopy (TEM).

In the iron oxide film, a simple substance or compound that is constituted by the above carbon is preferably dispersed in an iron oxide matrix. That is, the iron oxide film preferably includes an iron oxide matrix and a simple substance or compound that is constituted by the carbon and dispersed in the iron oxide matrix.

The proportion of carbon (sometimes referred to as a "carbon percentage") in the simple substance or compound that is constituted of carbon and dispersed in the iron oxide matrix is preferably from 5 to 30%, more preferably from 9 to 28%, and even more preferably from 11 to 16%. When the above percentage is within the range described above, the coefficient of friction of the sliding member surface according to an embodiment of the present invention is more uniformly reduced. The above percentage can be determined by using a microscope to observe a cross-section of the iron oxide film in any region (for example, any region enclosed by a 150 nm square), and then binarizing the image. In this case, an RGB threshold value is preferably from 5 to 50, and a deletion area is preferably not greater than 2 $nm^2$ or not greater than 0.5 $nm^2$.

The sliding member according to an embodiment of the present invention is such that when a ball-on-disk sliding friction testing apparatus that uses a ball having an SUJ2 sliding surface on a surface is used, and the ball is slid under a load of 10 N at a speed of 50 mm/s, the coefficient of friction of the sliding member surface with respect to the ball is preferably 0.14 or less, more preferably 0.13 or less, and even more preferably 0.12 or less. The coefficient of friction is specifically measured by a friction test described below.

Friction test: Using a ball-on-disk sliding friction testing apparatus that is provided with a disk that uses, as the disk surface, a surface of the iron oxide film of the sliding member according to an embodiment of the present invention, and also with a ball having an SUJ2 sliding surface on the surface, the coefficient of friction between the disk and the ball is measured when the ball is slid under a load of 10 N and at a speed of 50 mm/s.

(Method for Manufacturing a Sliding Member)

The sliding member according to an embodiment of the present invention can be manufactured, for example, by sliding the iron-made base material and an iron-made body against each other in the presence of a nanodiamond dispersion composition containing an organic dispersion medium and nanodiamond particles, to thereby form the iron oxide film on the surface of the iron-made base material. Note that, according to the manufacturing method described above, an iron-made base material is used as the base material, and therefore a sliding member having an iron-made base material and an iron oxide film provided on a surface of the iron-made base material is obtained. Note that the method for manufacturing the sliding member according to the present invention is not limited to the method described above, and for example, the sliding member according to an embodiment of the present invention can be manufactured by using a known or commonly used method to apply a composition containing the above carbon and iron oxide onto an iron-made base material or a base material other than an iron-made base material to thereby form the iron oxide film.

The iron-made base material is used as the base material on which the iron oxide film is provided on the surface in the obtained sliding member. Examples of the iron-made base material include those constituted from iron materials exemplified and described as iron materials constituting the iron-made base material of the sliding member according to an embodiment of the present invention.

The iron-made body is an object that is made of iron and used to slide against with the iron-made base material. Examples of the iron material constituting the iron-made body include those iron materials exemplified and described as iron materials constituting the iron-made base material of the sliding member according to an embodiment of the present invention. The iron-made body may be constituted from a single type of iron material, or may be constituted from two or more types of iron materials. Of these, SUJ (for example, SUJ2) is preferable. The iron material constituting the iron-made body may be the same type as the iron material constituting the iron-made base material (for example, SUJ and SUJ), or may be a different type (SUS and SUJ, for example). Furthermore, the form of the iron-made body is not particularly limited, and examples include spherical and rectangular parallelepiped.

The nanodiamond dispersion composition includes an organic dispersion medium and nanodiamonds. The ND dispersion composition described above may be one that is used as a so-called lubricant composition. The lubricant composition may be an initial break-in lubricant composition. As the initial break-in lubricant composition, the initial break-in lubricant composition according to an embodiment of the present invention in which nanodiamond particles are used as nanocarbon particles can be used. From perspectives such as being able to efficiently form the iron oxide film, and being able to stably form an iron oxide film with excellent stability during the formation of the iron oxide film, a preferred aspect of the nanodiamond dispersion composition described above is the same as the preferred aspect of the initial break-in lubricant composition according to an embodiment of the present invention.

When initial break-in of the sliding portion is implemented using the initial break-in lubricant composition according to an embodiment of the present invention, a sliding member according to an embodiment of the present invention can be easily and economically manufactured with the iron oxide film formed on an iron-made base material and with a reduced coefficient of friction. Furthermore, through the use of the ND dispersion composition, seizing of the sliding member can be suppressed, and the amount of wear of the iron-made base material can be reduced.

Furthermore, as shown by the Stribeck curve, the coefficient of friction of the sliding portion when a lubricant is used varies across a fluid lubricating region, a mixed lubricating region, and a boundary lubricating region depending on the viscosity, sliding speed, and load of the lubricant. In the fluid lubricating region, the sliding members are separated by a continuous lubricant film, and the distance between the sliding members is much greater than the surface roughness of the sliding members. Thus, the frictional resistance in the fluid lubricating region is primarily due to the internal friction of the lubricant. From the fluid lubricating region, as the load increases and the lubricant film becomes thinner due to a decrease in sliding speed or an increase in temperature, the coefficient of friction increases rapidly and changes to the mixed lubricating region, and then the boundary lubricating region. In the boundary lubricating region, the frequency of solid contact between the members increases, and the portion supported by the lubricant film is extremely low. Therefore, in the boundary lubricating region, primarily, the surface physical properties of the sliding member have a greater effect on the frictional resistance than physical properties such as the wear resistance of the lubricant. On the other hand, using the initial break-in lubricant composition according to an embodiment of the present invention makes it is possible to reduce the coefficient of friction in the boundary lubricating region and to widen the mixed lubricating region and the fluid lubricating region. In addition, the sliding member according to an embodiment of the present invention reduces the coefficient of friction in the boundary lubricating region, and has a wide mixed lubricating region and a wide fluid lubricating region.

EXAMPLES

Hereinafter, the present invention will be described in more detail based on examples, but the present invention is not limited by these examples.

Example 1

Surface-modified ND particles, an initial break-in lubricant composition, and an iron oxide film were manufactured through the following steps.
(Production of Surface-Modified ND Particles)
First, the formation of nanodiamonds by a detonation method was performed. In the present formation, first, a molded explosive attached with an electric detonator was placed inside a pressure-resistant vessel for detonation, and the vessel was sealed. The vessel was made of iron and had a capacity of 15 m$^3$. As the explosive, 0.50 kg of a mixture of TNT and RDX was used. The mass ratio of the TNT and RDX (TNT/RDX) in the explosive was 50/50. The electric detonator was then triggered to detonate the explosive in the vessel (formation of nanodiamond by detonation method). Then the temperatures of the vessel and the inside of the vessel were decreased by allowing the vessel to stand at room temperature for 24 hours. After the cooling, a nanodiamond crude product (containing the aggregate of the nanodiamond particles and soot formed in the above detonation method), which adhered to the inner wall of the vessel, was scraped with a spatula, and the nanodiamond crude product was thereby collected.

The nanodiamond particle crude product obtained by performing the formation as described above multiple times was then subjected to an acid treatment. Specifically, a slurry obtained by adding 6 L of a 10 mass % hydrochloric acid to 200 g of the nanodiamond crude product was subjected to a heat treatment under reflux at normal pressure conditions for 1 hour. The heating temperature in this acid treatment was from 85 to 100° C. Then, after cooling, the solid (containing the nanodiamond aggregates and soot) was washed with water by decantation. The solid was repeatedly washed with water by decantation until the pH of the precipitation solution reached 2 from the low pH side.

An oxidation treatment was then performed. Specifically, 6 L of 98 mass % sulfuric acid and 1 L of 69 mass % nitric acid were added to the precipitate solution (containing the nanodiamond aggregate) obtained through decantation after the acid treatment to form a slurry, and then the slurry was subjected to heat treatment under reflux at normal pressure conditions for 48 hours. The heating temperature in this oxidation treatment was from 140 to 160° C. Then, after cooling, the solid (containing the nanodiamond aggregates) was washed with water by decantation. The initial supernatant liquid from the water washing was colored, and therefore washing of the solid content with water by decantation was repeated until the supernatant liquid became visually clear.

Next, 1000 mL of the nanodiamond-containing solution obtained through the water washing treatment described above was subjected to spray drying using a spray dryer (trade name "Spray Dryer B-290", available from Nihon Büchi Co., Ltd.). Through this, 50 g of nanodiamond powder was obtained.

An amount of 0.3 g of the nanodiamond particles obtained in the drying process described above was weighed into a reaction vessel, 13.5 g of methyl isobutyl ketone (MIBK) as an organic dispersion medium, and 1.2 g of hexyltrimethoxysilane as a silane compound were added thereto, and the mixture was stirred for 10 minutes.

After stirring, 36 g of zirconia beads (trade name "YTZ", available from Tosoh Corporation; diameter: 30 µm) was added. After the addition, while cooling in ice water, the mixture was subjected to an ultrasonic treatment for 20 hours using an ultrasonic disperser (model "UP-400s", available from Hielscher Ultrasonics GmbH) with a tip of an oscillator of the ultrasonic disperser immersed in the solution in the reaction vessel, and the ND particles and the silane compound were reacted. The mixture was initially gray, but the particle size gradually became smaller, and the dispersion state improved. Finally, the mixture became a uniform, black liquid. This is thought to be because the ND particles were sequentially disintegrated (crushed) from ND particle aggregates, the silane compound acted on the dissociated ND particles and bonded thereto, and the surface-modified ND particles were dispersed and stabilized in the MIBK. In this manner, an ND dispersion (MIBK dispersion) containing surface-modified ND particles having the silane compound bonded to the surface was obtained.

The particle size distribution of the ND particles in the obtained ND dispersion was measured by dynamic light scattering (non-contact backscattering) using a device (trade name "Zetasizer Nano ZS") available from Malvern Panalytical Ltd., and the average dispersed particle size (D50) of the ND particles was determined to be 12 nm.
(Production of the Initial Break-in Lubricant Composition)
One gram of a polyol ester was added to 10 g of the surface-modified ND dispersion obtained as described above, and then the mixture was stirred and mixed, and the MIBK was distilled off using a rotary evaporator, and thus the ND particles did not become a dry powder. Next, a polyol ester was added to the concentrated residue to achieve a total weight of 10 g, the mixture was stirred and mixed, and the surface-modified ND particles were dispersed in the polyol ester using an ultrasonic disperser (model "UP-400s", available from Hielscher Ultrasonics GmbH). In the manner described above, an initial break-in lubricant composition containing surface-modified ND particles having a silane compound bonded to the surface was obtained. The nanodiamond concentration at this time was 2.89 mass %. Note that the nanodiamond concentration was calculated from the absorbance at 350 nm.
(Production of the Iron Oxide Film)
The initial break-in lubricant composition was diluted with a polyol ester to achieve a concentration of surface-modified ND particles of 10 ppm by mass, and the diluted lubricant composition was used as an iron oxide film-forming composition. The particle size distribution of the ND particles in the diluted iron oxide film-forming composition was measured by dynamic light scattering (non-contact backscattering) using a device (trade name "Zetasizer Nano ZS") available from Malvern Panalytical Ltd., and the average dispersed particle size (D50) of the ND particles was determined to be 24 nm. A ball-on-disk sliding friction testing apparatus (device name: "UMT-3", available from Bruker Corporation) was used in the formation of the iron oxide film. As the ball and disk of the friction tester described above, a ball made of SUJ2 with a diameter of 4 mm and a disk made of SUJ2 with a diameter of 30 mm and a thickness of 4 mm were used, and both were subjected to a mirror polishing process (Ra=25 nm or less) after quenching. At the startup of sliding of the ball and disk, 1 mL of the iron oxide film-forming composition was dripped onto the sliding surface of the disk surface, and the test was performed at room temperature. The conditions for film formation included a sliding speed of 50 mm/s, a load of 10 N, and a sliding distance of 400 m. Subsequently, the ball and disk were removed from the friction tester and washed with hexane and acetone to remove the iron oxide film-forming composition. In this manner, an iron oxide film was formed on the surface of the base material made of SUJ2, which was a disk, and a sliding member of Example 1 was obtained.

Comparative Example 1

An iron oxide film was formed in the same manner as in Example 1 with the exception that a polyol ester not containing ND particles was used as the iron oxide film-forming composition in place of the initial break-in lubricant composition described above, and a sliding member of Comparative Example 1 was obtained.

(Evaluation)

The iron oxide films and sliding members produced in the Examples and Comparative Examples were subjected to the following evaluations.

(1) TEM-EELS Measurement

The iron oxide film surface was washed with cyclohexane and acetone, and microscopic pieces were vertically extracted from the iron oxide film using a focused ion beam (FIB) processing device equipped with a scanning electron microscope (SEM). The thickness of the microscopic pieces was then reduced to a thickness through which an electron beam could pass, and measurement samples were thereby obtained. The microscopic pieces were collected under the processing conditions described below.

Processing and observation device: FIB-SEM device (trade name: "Versa 3D DualBeam", available from FEI Company)

Pretreatments: Au sputter coat (prior to FIB processing device introduction)

Carbon vapor deposition (prior to FIB processing device introduction)

Carbon deposition (after FIB processing device introduction)

Acceleration voltage: 30 kV (5 kV at the time of the final finish)

Sample support table material: Mo

The depth of each obtained measurement sample from the iron oxide film surface (surface of the side opposite the base material made of SUJ2) to the base material made of SUJ2 was subjected to a TEM-EELS measurement using a TEM/STEM device equipped with an SSLS detector. The TEM-EELS measurements were performed under the following conditions.

TEM/STEM device trade name "JEM-ARM200F (Cold-FEG)", available from JEOL Ltd.

EELS detector: trade name "GIF-Quantum ER", available from Gatan, Inc.

EELS diaphragm diameter: 2.5 mm

Figure 3:
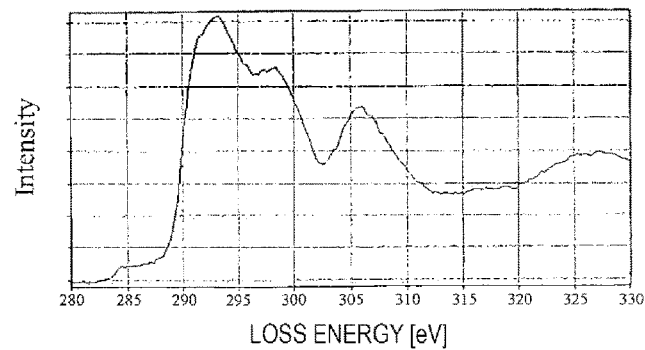
FIG. 3 is a graph showing an EELS spectrum of carbon in the iron oxide film of Example 1.
Figure 4:
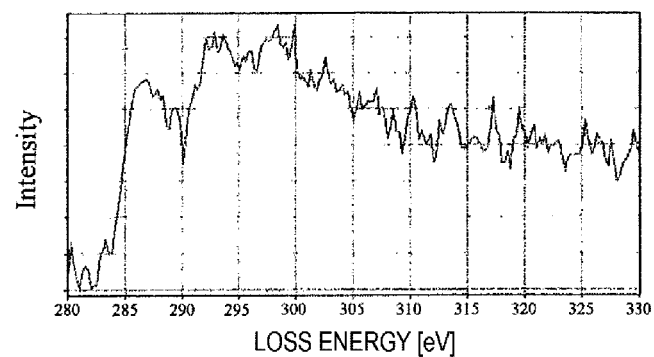
FIG. 4 is a graph showing an EELS spectrum of carbon in the iron oxide film of Comparative Example 1, in the vicinity of the surface of the iron oxide film.
Figure 5:
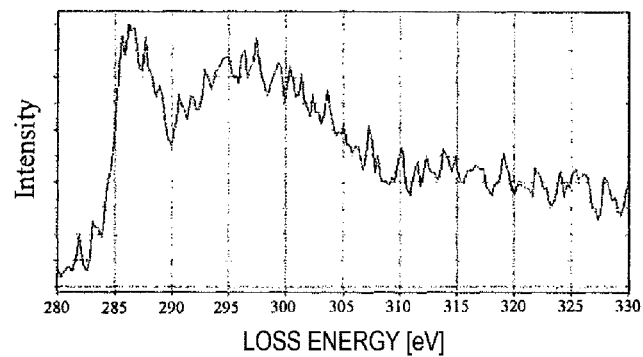
FIG. 5 is a graph showing an EELS spectrum of carbon in the iron oxide film of Comparative Example 1, in the vicinity of a boundary with the base material.

With regard to carbon, the EELS spectrum obtained for the measurement sample of Example 1 is illustrated in FIG. 3, and the EELS spectra obtained for the measurement sample of Comparative Example 1 are illustrated in FIG. 4 and FIG. 5. FIG. 4 illustrates the EELS spectrum of carbon in the vicinity of the iron oxide film surface, and FIG. 5 illustrates the EELS spectrum of carbon near the boundary with the SUJ2 base material.

As illustrated in FIG. 3, a spectral shape having characteristic peaks of loss energy near 295 eV, near 300 eV and near 305 eV can be seen for the carbon in the iron oxide film of Example 1, and it is clear that the shape thereof differs from that of the σ* peaks of amorphous carbon and graphite, and is similar to the σ* peaks of diamond. In addition, a π* peak that cannot be confirmed in diamond can also be confirmed near a loss energy of 285 eV in the spectrum illustrated in FIG. 3. On the other hand, as illustrated in FIG. 4, a characteristic peak was not observed in the loss energy range from 280 to 330 eV for carbon near the iron oxide film surface of Comparative Example 1, and it was difficult to determine from the spectral shape whether the carbon was similar to carbon of any of amorphous carbon, graphite, and diamond. In addition, as illustrated in FIG. 5, similar to FIG. 4, no characteristic peak was observed within the loss energy range from 280 to 330 eV for carbon near the boundary with the SUJ2 base material in Comparative Example 1, and it was difficult to determine from the shape whether the carbon was similar to carbon of any of amorphous carbon, graphite and diamond.

Regarding the iron oxide, the EELS spectra of the measurement samples of Example 1 and Comparative Example 1 were measured from the iron oxide film surface to as far as slightly entering the SUJ2 base material beyond the boundary between the iron oxide film and the SUJ2 base material. As a result, the loss energy at the peak top of iron oxide at the base material-iron oxide film interface was approximately 709.5 eV. Furthermore, the maximum loss energy at the peak top for the iron oxide in the iron oxide film of Example 1 was approximately 711.0 eV, and the maximum loss energy at the peak top for the iron oxide in the iron oxide film of Comparative Example 1 was approximately 710.75 eV.

(2) Carbon Percentage

Figure 6:
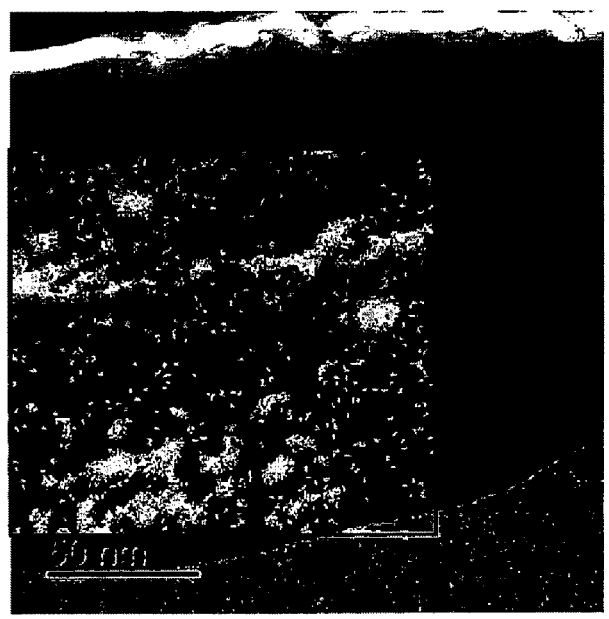
FIG. 6 is an analysis image used when measuring the percentage of carbon in the iron oxide film of Example 1.

Images of the iron oxide film cross-section of Example 1 were captured using an electron microscope, the contrast for the JPEG formatted images was set to +50, and the brightness was set to −5. Next, image analysis was performed on a 150 μm square using the image processing software "WinROOF", and the percentage (carbon percentage) of carbon in the simple substance or compound that is constituted by carbon was calculated. Note that the image analysis was performed under four conditions as combinations of the RGB threshold value and deletion area (threshold value: deletion area), namely (50:0.5 $nm^2$ or less), (50:2 $nm^2$ or less), (45:2 $nm^2$ or less), and (45:0.5 $nm^2$ or less). Also note that the peak size was regarded as 1. The analysis image at a condition of (threshold value:deletion area) of (45:2 $nm^2$ or less) is illustrated in FIG. 6. The measured carbon percentages were 28% at (50:0.5 $nm^2$ or less), 23% at (50:2 $nm^2$ or less), 11% at (45:2 $nm^2$ or less), and 9% at (45:0.5 $nm^2$ or less), respectively.

(3) Coefficient of Friction

Figure 7:
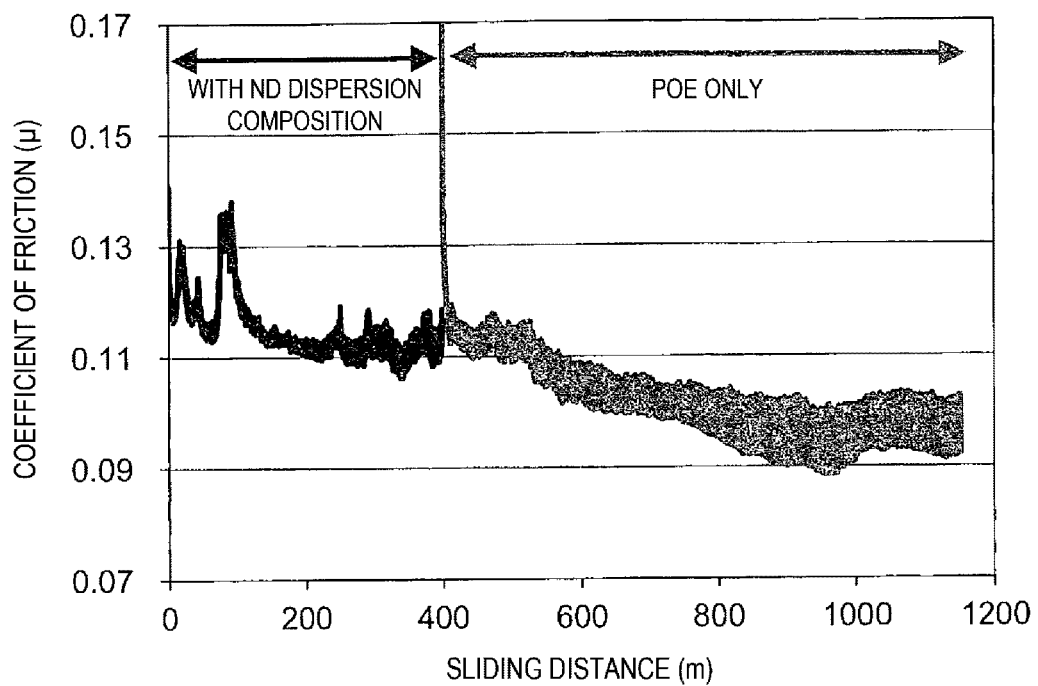
FIG. 7 is a graph showing a change in the coefficient of friction of the sliding member surface of Example 1.
Figure 8:
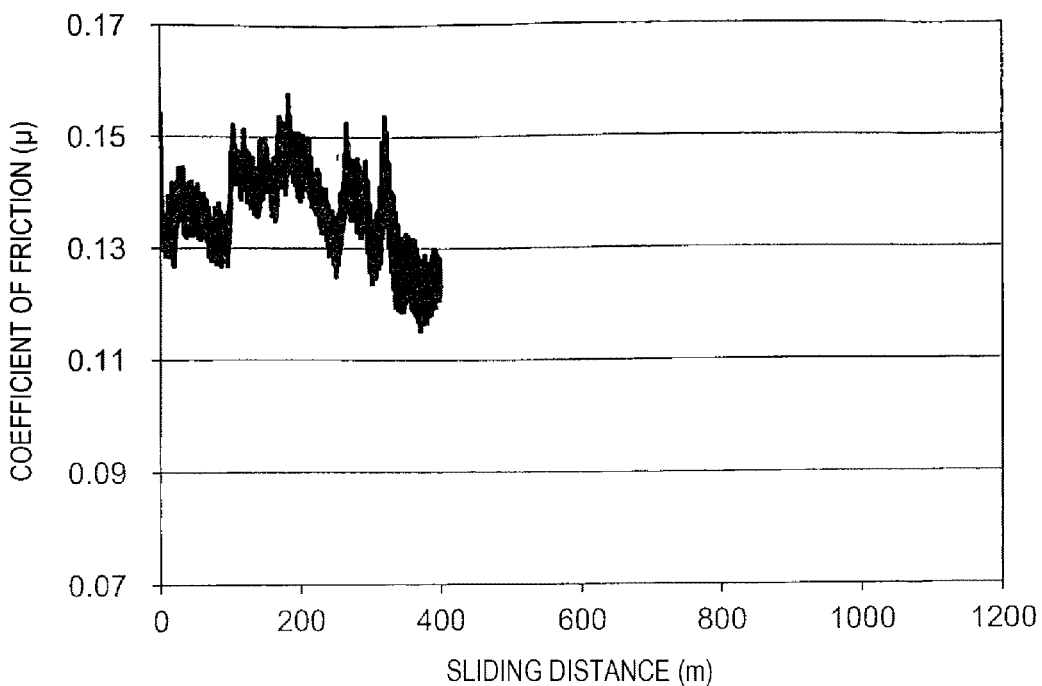
FIG. 8 is a graph showing a change in the coefficient of friction of the sliding member surface of Comparative Example 1.
Figure 9:
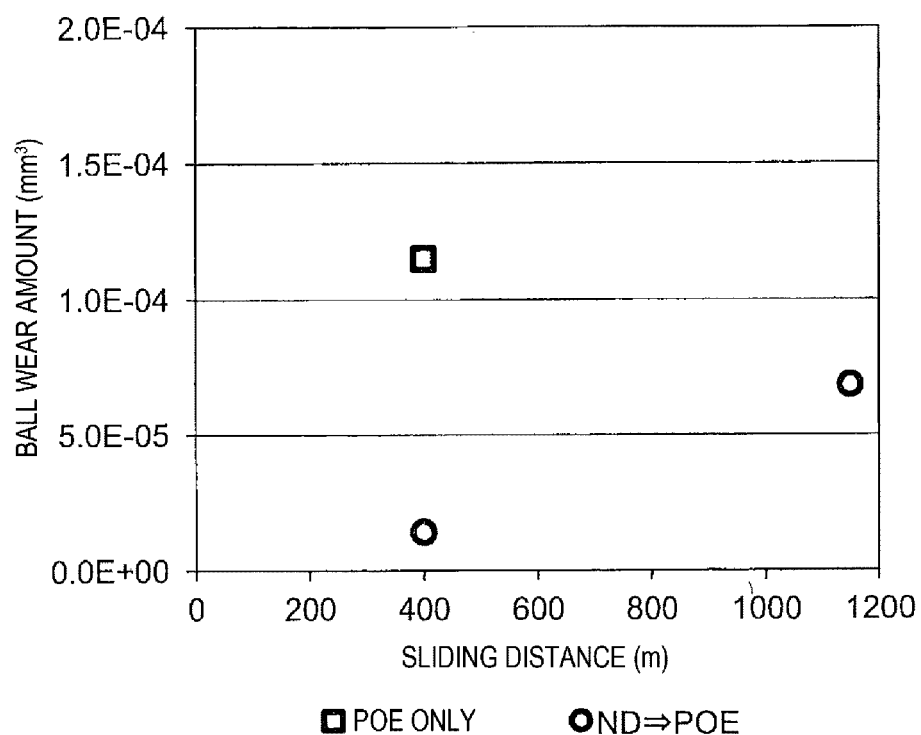
FIG. 9 is a graph showing a transition in the amount of wear of a ball with regards to formation of the iron oxide film.

The coefficient of friction of the sliding member surfaces obtained in the Examples and Comparative Examples were measured. The results are shown in Table 1. Note that the coefficient of friction was measured at 200 m and 400 m starting from when sliding was initiated in the formation of the iron oxide film. Furthermore, in Example 1, the ball was slid another 750 m (1150 m starting from when sliding was initiated in the formation of the iron oxide film) using a polyol ester as the lubricating oil, and a friction test was implemented. Specifically, after the iron oxide film was formed by sliding the ball 400 m as described above, first the droplets were completely removed from the surface of the sliding member by dry air, and the removed ball was returned to the friction tester. The test was restarted using a polyol ester as a lubricating oil, and the ball was slid 750 m. The change in the coefficient of friction from the startup of sliding to a distance of 1150 m in the formation of the iron oxide film of Example 1 is illustrated in FIG. 7. In addition, FIG. 8 illustrates a change in the coefficient of friction from the startup of sliding to a distance of 400 m in the formation of the iron oxide film of Comparative Example 1. Furthermore, the transition in the amount of wear of the ball is illustrated in FIG. 9.

In Comparative Example 1 (FIG. 8) in which initial break-in was implemented using only the polyol ester, a low friction surface (break-in surface) was still not formed in the iron oxide film produced by sliding a distance of around 400 m, and the coefficient of friction of the sliding member surface was around 0.12, which is high. Meanwhile, in Example 1 (FIG. 9) in which initial break-in was implemented using the initial break-in lubricant composition of the present invention containing a specific amount of ND particles (Example 1, FIG. 1), an iron oxide film having a break-in surface with a coefficient of friction of around 0.11 was formed at an early stage after the ball was slid approximately 200 m. Furthermore, even when the initial break-in lubricant composition was subsequently replaced with only the polyol ester, the coefficient of friction did not increase, and the coefficient of friction decreased further to about 0.10. Thus, with the initial break-in lubricant composition according to an embodiment of the present invention, a low-friction surface (break-in surface) can be formed at an early stage on the sliding portion. Furthermore, the sliding member according to an embodiment of the present invention and having an iron oxide film on which a low-friction surface is formed can achieve low friction at the subsequent sliding portion. The results of the friction test are shown in Table 1.

TABLE 1

|  | Coefficient of Friction (μ) | | | Ball Wear Amount (mm³) | |
| --- | --- | --- | --- | --- | --- |
| Sliding distance | 200 m | 400 m | 1150 m | 400 m | 1150 m |
| Example 1 | 0.1125 | 0.1186 | 0.1009 | 1.45E−05 | 6.87E−05 |
| Comparative Example 1 | 0.1394 | 0.1233 | — | 1.15E−04 | — |

The amount of wear of the ball was calculated by the following wear amount calculation method.

Wear Amount Calculation Method

A circular wear mark formed in the ball used in the friction tests described above was observed using a confocal microscope, and from the observed image, a diameter r (mm) was determined with the assumption that the circular wear mark is a uniformly smooth plane. The ball wear volume V (mm³) was calculated using the following equations (1) and (2). In equation (1), h is the height (mm) of a spherical crown of the circular wear mark, and is determined by the following equation (2). R in equation (2) is the radius of the ball, and is 2 (mm).

[Equation 1]

$$V = \frac{\pi h}{6}(3r^2 + h^2) \quad (1)$$

$$h = R - (R^2 - r^2)^{1/2} \quad (2)$$

Regarding the amount of ball wear, as shown in Table 1 and FIG. 9, with the sliding member of Comparative Example 1, the wear progressed to $1.15 \times 10^{-4}$ mm³ after sliding approximately 400 m, whereas with the sliding member of Example 1, only a slight amount of wear of $0.15 \times 10^{-4}$ m³ was exhibited after sliding approximately 400 m. Even after the ball was slid another 750 m (1150 m total) after the initial break-in lubricant composition was replaced with the polyol ester, the amount of wear was $0.69 \times 10^{-4}$ mm³, and wear of the extent of that of the Comparative Example was not exhibited. That is, it is clear that with the sliding member according to an embodiment of the present invention, a low friction surface is quickly formed, and when a lubricant composition is used thereafter, the low friction surface can be maintained while also suppressing wear in subsequent sliding.

Figure 10:
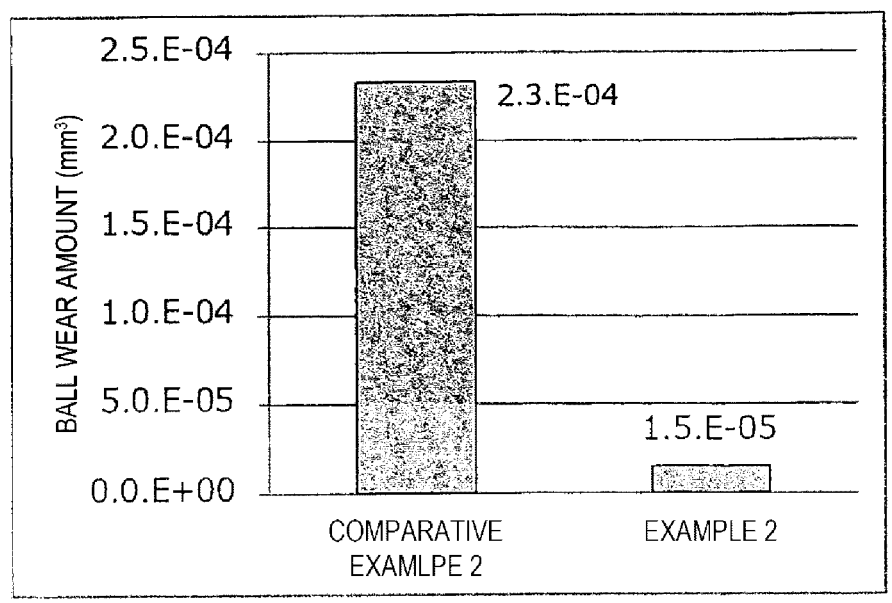
FIG. 10 is a graph showing a comparison of the amount of ball wear at a sliding distance of 800 m in Example 2 and Comparative Example 2.

Furthermore, the iron oxide film-forming composition used in Example 1 was used to separately form an iron oxide film (Example 2). A ball-on-disk sliding friction testing apparatus (device name: "UMT-3", available from Bruker Corporation) was used in the formation of the iron oxide film. As the ball and disk of the base material, a ball made of SUJ2 with a diameter of 4 mm and a disk made of SUJ2 with a diameter of 30 mm and a thickness of 4 mm were used, and both were subjected to a mirror polishing process (Ra=25 nm or less) after quenching. At the startup of sliding, 1 mL of the iron oxide film-forming composition was dripped onto the sliding surface of the disk surface, and sliding was performed at room temperature. The sliding conditions included a sliding speed of 50 mm/s, a load of 10 N, and a sliding distance of 800 m. Also, as Comparative Example 2, only a polyol ester was used as the iron oxide film-forming composition, and the ball was slid 800 m. Furthermore, the diameter r of the circular wear mark formed in the ball after forming the iron oxide film, and the ball wear volume V were calculated in accordance with the wear amount calculation method described above. As a result, in Comparative Example 2, after the ball was slid 800 m, the width of the circular wear mark was 312 μm, and the ball wear amount progressed to $2.3 \times 10^{-4}$ mm³, whereas in Example 2, after the ball was slide 800 m, the width of the circular wear mark was 158 μm, and the ball wear amount was $0.15 \times 10^{-4}$ mm³, which was only a slight amount. Note that FIG. 10 illustrates a graph in which the ball wear amounts (mm³) are compared for a case in which the ND dispersion composition was used in the formation of the iron oxide film (Example 2) and a case in which only the polyol ester was used (Comparative Example 2).

To summarize the above, configurations of the present invention and variations thereof will be described below.

[1] An initial break-in lubricant composition including an organic dispersion medium and a nanocarbon particle in a quantity from 0.1 to 2000 ppm by mass.

[2] The initial break-in lubricant composition according to [1], wherein the above nanocarbon particle is a particle of one or more nanocarbon material(s) selected from the group consisting of: a nanodiamond, a fullerene, graphene oxide, nanographite, a carbon nanotube, a carbon nanofilament, onion-like carbon, diamond-like carbon, amorphous carbon, carbon black, a carbon nanohorn, and a carbon nanocoil.

[3] The initial break-in lubricant composition according to [1] or [2], wherein the above organic dispersion medium is one or more selected from the group consisting of: a polyol ester, a poly-α-olefin, a mineral oil, an alkylbenzene, and a polyalkylene glycol.

[4] The initial break-in lubricant composition according to any one of [1] to [3], wherein an average dispersed particle size D50 of the above nanocarbon particle is from 4 to 80 nm.

[5] The initial break-in lubricant composition according to any one of [1] to [4], having a coefficient of friction of 0.14 or less after 200 m sliding when used as an initial break-in lubricant on an SUJ2 sliding surface, the friction coefficient as measured by Friction Test 1 as follows:

Friction Test 1: Using a ball-on-disk sliding friction testing apparatus including a disk having an SUJ2 sliding surface on its surface and a ball having an SUJ2 sliding surface on its surface, a coefficient of friction between the disk and the ball is measured when the ball is sliding 200 m under a load of 10 N at a speed of 50 mm/s with 1 mL of the initial break-in lubricant composition being applied dropwise.

[6] The initial break-in lubricant composition according to any one of [1] to [5], having 0.90 to 1.10 as a ratio between a coefficient of friction after 400 m sliding when the initial break-in lubricant composition is used as an initial break-in lubricant on an SUJ2 sliding surface and a coefficient of friction after 750 m sliding when another lubricant is used, the ratio being [the former coefficient of friction]/[the latter coefficient of friction] as measured by Friction Test 2 as follows:

Friction Test 2: Using a ball-on-disk sliding friction testing apparatus including a disk having an SUJ2 sliding surface on its surface and a ball having an SUJ2 sliding surface on its surface, a coefficient of friction between the disk and the ball is measured when the ball is sliding 400 m under a load of 10 N at a speed of 50 mm/s with 1 mL of the initial break-in lubricant composition being applied dropwise, and after the initial break-in lubricant composition is removed, a coefficient of friction between the disk and the ball is measured when the ball is further sliding 750 m (a total of 1150 m) under a load of 10 N at a speed of 50 mm/s with 1 mL of a polyol ester being applied dropwise.

[7] The initial break-in lubricant composition according to any one of [1] to [6], wherein the above nanocarbon particle is a nanodiamond.

[8] The initial break-in lubricant composition according to [7], wherein the above nanodiamond is a surface-modified nanodiamond having a silane compound bonded to its surface.

[9] The initial break-in lubricant composition according to [8], wherein the above silane compound contains a compound represented by Formula (1-1) below:

[Chem. 1]

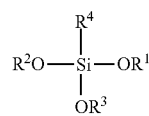

(1-1)

[In Formula (1-1) $R^1$, $R^2$, and $R^3$ may be the same or different, and each represent an aliphatic hydrocarbon group having from 1 to 3 carbons. $R^4$ represents an aliphatic hydrocarbon group having one or more carbons.]

[10] The initial break-in lubricant composition according to [9], wherein $R^4$ is an aliphatic hydrocarbon group having 4 or more carbons (preferably an aliphatic hydrocarbon group having 6 or more carbons).

[11] The initial break-in lubricant composition according to [9] or [10], wherein $R^4$ is an aliphatic hydrocarbon group having not more than 25 carbons (preferably an aliphatic hydrocarbon group having not more than 20 carbons).

[12] The initial break-in lubricant composition according to [10] or [11], wherein the above aliphatic hydrocarbon group is a linear or branched alkyl group or alkenyl group (preferably a linear or branched alkyl group).

[13] The initial break-in lubricant composition according to any one of [1] to [12], wherein a haze value is 5 or less.

[14] The initial break-in lubricant composition according to any one of [1] to [13], which is used to form a low-friction surface (break-in surface) at an initial stage of a machine having a sliding member.

[15] A sliding member having a base material and an iron oxide film provided on a surface of the above base material, the iron oxide film including carbon having, in a spectrum obtained through TEM-EELS measurements, a pi star (π*) peak observed in a loss energy range from 280 to 290 eV, and sigma star (σ*) peaks observed in a loss energy range from 290 to 295 eV, a loss energy range from 295 to 300 eV, and a loss energy range from 302 to 310 eV, respectively.

[16] The sliding member according to [15], wherein the above iron oxide film includes a first iron oxide and a second iron oxide, the second iron oxide having a valency of iron different from the first iron oxide.

[17] The sliding member according to [15] or [16], wherein the above iron oxide film includes an iron oxide having a valency of iron being three.

[18] The sliding member according to any one of [15] to [17], wherein the above base material is an iron-made base material.

[19] The sliding member according to [18], wherein an iron material constituting the above iron-made base material is SUJ (such as SUJ2).

[20] The sliding member according to any one of [15] to [19], wherein, in the above iron oxide film, a difference between a maximum loss energy at the peak top of the iron oxide in the iron oxide film and the loss energy at the peak top of the iron oxide at the base material-iron oxide film interface, that is, the [(maximum loss energy in the iron oxide film)−(loss energy at interface between the base material and iron oxide film)], is not less than 1.3 eV.

[21] The sliding member according to any one of [15] to [20], wherein the above iron oxide film includes an iron oxide matrix, and a simple substance or a compound that is constituted by carbon and dispersed in the iron oxide matrix.

[22] The sliding member according to [21], wherein a proportion of the simple substance or the compound that is constituted by carbon and dispersed in the iron oxide matrix is from 5 to 30%.

[23] The sliding member according to any one of [15] to [22], wherein when a ball-on-disk sliding friction testing apparatus including a ball having an SUJ2 sliding surface is used, and the ball slides on a surface of the sliding member under a load of 10 N at a speed of 50 mm/s, the sliding member has a coefficient of friction of 0.14 or less on its surface with respect to the ball.

[24] A method of manufacturing a sliding member including an iron-made base material and an iron oxide film that is provided on a surface of the iron-made base material, the method comprising sliding the iron-made base material and an iron-made body against each other in the presence of a nanodiamond dispersion composition including an organic dispersion medium and nanodiamond particles so as to form the iron oxide film.

REFERENCE SIGNS LIST 1, 2 Sliding member
11, 21 Base material
12, 22 Iron oxide film
22a Iron oxide film unformed region

The invention claimed is:

1. An initial break-in lubricant composition comprising an organic dispersion medium, and a nanocarbon particle in a quantity from 0.1 to 500 ppm by mass, wherein the nanocarbon particle is a surface-modified nanodiamond particle, the surface of which is modified by at least one selected from a group consisting of silane compounds, a phosphonate ion, phosphonic acid residue, a surface-modifying group having a vinyl group at a terminal, a cation of a cationic surfactant, a group containing a polyglycerin chain, and a group containing a polyethylene glycol chain.

2. The initial break-in lubricant composition according to claim 1, wherein the organic dispersion medium is one or more selected from the group consisting of: a polyol ester, a poly-α-olefin, a mineral oil, an alkylbenzene, and a polyalkylene glycol.

3. The initial break-in lubricant composition according to claim 1, wherein an average dispersed particle size D50 of the nanocarbon particle is from 4 to 80 nm.

4. The initial break-in lubricant composition according to claim 1, having a coefficient of friction of 0.14 or less after 200 m sliding when used as an initial break-in lubricant on an SUJ2 sliding surface, the friction coefficient as measured by Friction Test 1 as follows:

Friction Test 1: Using a ball-on-disk sliding friction testing apparatus including a disk having an SUJ2 sliding surface on its surface and a ball having an SUJ2 sliding surface on its surface, a coefficient of friction between the disk and the ball is measured when the ball is sliding 200 m under a load of 10 N at a speed of 50 mm/s with 1 mL of the initial break-in lubricant composition being applied dropwise.

5. The initial break-in lubricant composition according to claim 1, having 0.90 to 1.10 as a ratio between a coefficient of friction after 400 m sliding when the initial break-in lubricant composition is used as an initial break-in lubricant on an SUJ2 sliding surface and a coefficient of friction after 750 m sliding when another lubricant is used, the ratio being [the former coefficient of friction]/[the latter coefficient of friction] as measured by Friction Test 2 as follows:

Friction Test 2: Using a ball-on-disk sliding friction testing apparatus including a disk having an SUJ2 sliding surface on its surface and a ball having an SUJ2 sliding surface on its surface, a coefficient of friction between the disk and the ball is measured when the ball is sliding 400 m under a load of 10 N at a speed of 50 mm/s with 1 mL of the initial break-in lubricant composition being applied dropwise, and after the initial break-in lubricant composition is removed, a coefficient of friction between the disk and the ball is measured when the ball is further sliding 750 m, a total of 1150 m, under a load of 10 N at a speed of 50 mm/s with 1 mL of a polyol ester being applied dropwise.

6. The initial break-in lubricant composition according to claim 1, which has a haze value of 5 or less.

7. The initial break-in lubricant composition according to claim 1, wherein an average dispersed particle size D50 of the nanocarbon particle is from 10 to 100 nm.

* * * * *